Patented July 7, 1925.

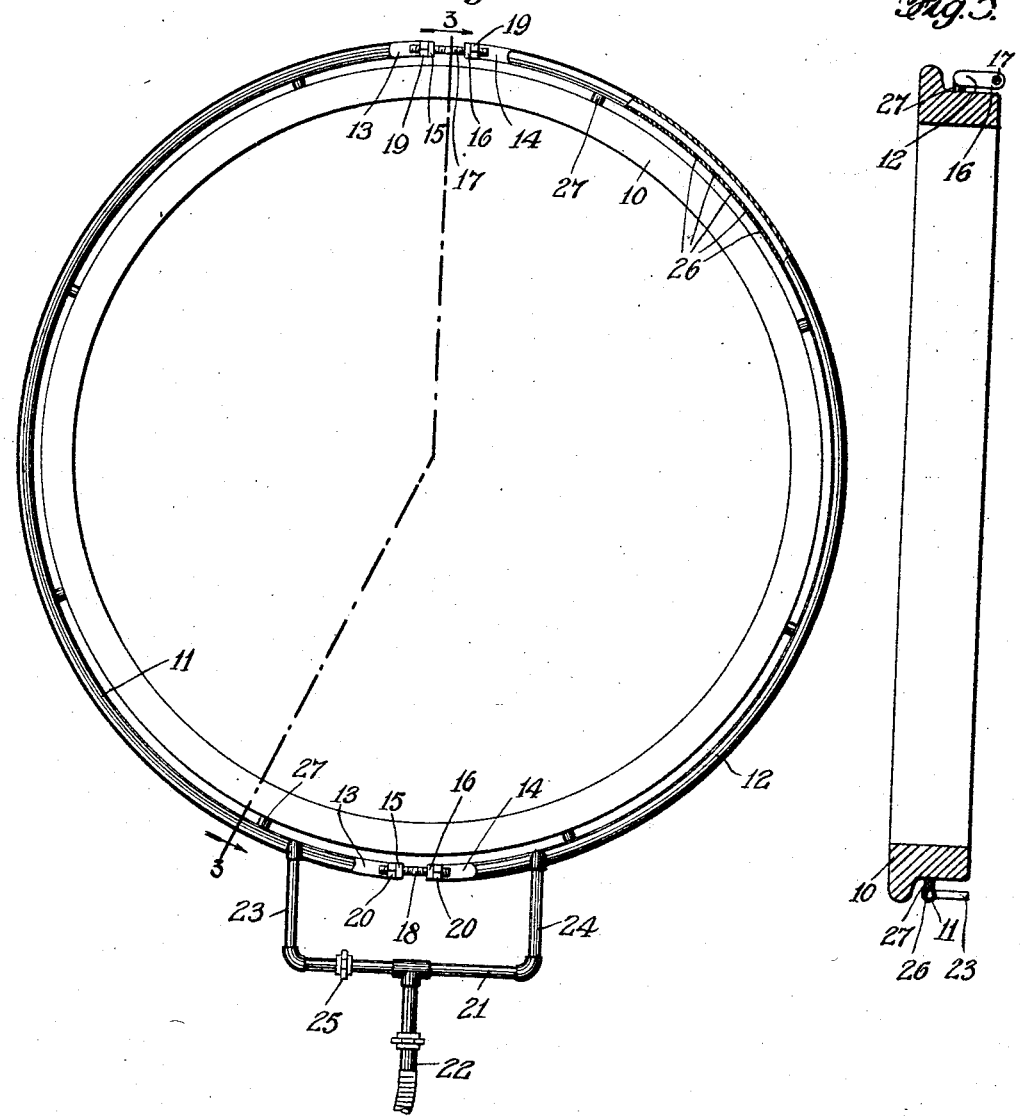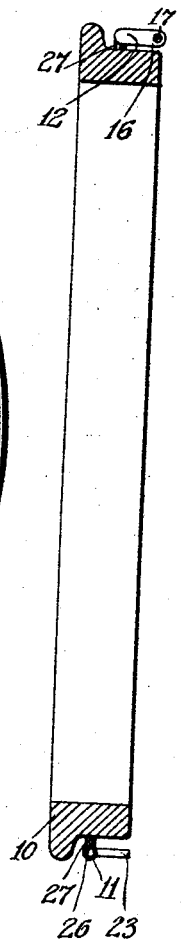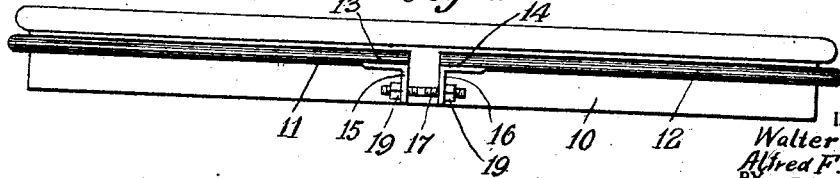

1,545,241

UNITED STATES PATENT OFFICE.

WALTER C. ELZE, OF WOODHAVEN, NEW YORK, AND ALFRED F. SCHUMANN, OF BALTIMORE, MARYLAND, ASSIGNORS TO HAUCK MANUFACTURING COMPANY, OF BROOKLYN, NEW YORK, A CORPORATION OF NEW YORK.

HEATER FOR METAL TIRES.

Application filed November 19, 1924. Serial No. 750,914.

*To all whom it may concern:*

Be it known that we, WALTER C. ELZE and ALFRED F. SCHUMANN, citizens of the United States, and residents of Woodhaven and Baltimore, respectively, in the counties of Queens and Baltimore, respectively, and States of New York and Maryland, respectively, have invented certain new and useful Improvements in Heaters for Metal Tires, of which the following is a specification.

The invention relates to a metal tire heater, and more particularly to a heater designed for use in connection with the expansion of metal tires such as are employed on locomotives, wagons and the like.

It has for its object a heater of this character which may readily be applied to the tire to be heated without necessitating removal, in the case, for example, of a locomotive or like apparatus, of a portion of the driving gear thereof. The heater, similarly, may readily be removed after completion of the heating operation; and the invention has for a further object a novel construction of heater whereby sufficient adjustability is attained to fit, within limits, the heater to different diameters in order to compensate for wear of the tires. A still further object of the invention resides in the arrangement for securing equal spacing between the heater surface and the periphery of the tire to be heated in order to insure a uniform heating of the latter, the particular arrangement insuring, also, a more equal distribution of the gasified fuel mixture to the heater.

The nature of the invention, however, will best be understood when described in connection with the accompanying drawings, in which—

Fig. 1 is a front elevation partly in section, of the novel heater member applied to a tire of a locomotive, as one application of the invention.

Fig. 2 is a plan thereof.

Fig. 3 is a vertical section taken on the line 3—3, Fig. 1, looking in the direction of the arrows.

Referring to the drawings, the novel type of tire heater is shown as applied to the tire 10 of a locomotive, as one object for which the heater is especially suitable, although it will be understood that the heater is equally suitable for application to various metal tires or rims of a circular form. Heretofore, it has been the practice to construct such heaters of one or more tubular members in the form of a circle of fixed diameter and adapted to be located over the periphery of the tire to be heated. In the present instance, however, the heater is constructed in manner to allow of a separation thereof, for example, it may be composed of two semi-circular tubes or half sections 11 and 12 having their respective ends 13 and 14 sealed so that the tubes are independent of each other so far as the supplying of fuel therethru is concerned. The invention, however, contemplates a union of one of the pair of ends 13 and 14, if desired, though the separation into two distinct fuel supply sources is to be maintained.

In accordance with the present invention, the two ends are arranged to be suitably drawn together, for example as indicated and where two halves are employed, thru lugs 15 and 16 extending outwardly at right angles from the respective sealed ends 13 and 14. The lugs are drilled, also, to allow bolts or stay rods 17 and 18 respectively to pass thru the cooperating pairs of lugs 15, 16 and are designed to receive nuts 19 and 20 respectively. By this expedient, it is possible to draw up conveniently the ends of the tube sections 11 and 12 to secure same over the periphery of the tire 10 preliminary to expanding same for subsequent shrinking over a wheel and without necessitating the dismantling of a portion of its driving gear.

In order to supply the desired combustible, which is usually an atomized oil mixed with the proper quantity of air, to the said sections, a header 21 is employed and connects thru a supply pipe 22 with a suitable source of liquid fuel supply (not shown), distributing the mixture thru the two arms 23 and 24 into the respective half sections 11 and 12. A union 25 is included in the header to facilitate disassembly and removal of the header from the tire upon completion of the heating, as well as attachment to the tire. In being thus supplied, the combustible mixture is obliged to travel in opposite directions thru the sections 11 and 12 and is arranged to be delivered therefrom, more or less equally, thru a series of radial openings 26 in the under face of said sections. The flames, upon ignition of the fuel, will then be directed radially toward the surface of the tire 10 in a series of jets substantially circumscribing the said surface; and in thus dividing the stream of the combustile mixture, the intensity thereof is substantially the same over the entire surface.

In order further to insure that the intensity of the heating effect on the surface of the tire shall be substantially equal thruout, there are provided on the two half sections 11 and 12 a plurality of inwardly extending cylindrical lugs or projections 27 which are spaced at equal intervals and are designed to contact with the tire surface as the two halves are drawn together. In this manner, the tubular sections are bent over uniformly and their openings 26 are all displaced substantially the same distance from the tire surface, the desired spaced relationship effected thereby being maintained thruout the heating period by the locking arrangement provided at the ends of the two semi-circular sections comprising the heater.

In applying the heater to the tire, the two sections 11 and 12 are separated the required extent, and which usually necessitates dismantling of the header at the union 25, and are then laid over the surface of a tire 10, the lugs 26 being directed thereto and more or less in contact with said surface. Thereupon, the two pairs of ends 13, 14 are secured to each other and the sections tightened up over the rim by means of the rods 17, 18 and nuts 19, 20 until all of the lugs 27 contact with the tire periphery. The combustible mixture may then be introduced thru the header, dividing into two streams, and ignited at the outlets 26 to provide an annulus of flame jets about the tire. When sufficiently heated, the tire may be separated from its heater as hereinbefore set forth.

We claim :—

1. A tire heater consisting of a hollow annular member comprising two independent and separable tubular portions lying in a common plane and sealed at their ends, each portion being provided with connections for a gaseous combustible mixture and having a series of radially directed outlets along the inner surface, and means to draw the portions together.

2. A tire heater consisting of a hollow annular member comprising two independent and separable tubular portions lying in a common plane and sealed at their ends, each portion being provided with connections for a gaseous combustible mixture and having a series of radially directed outlets along the inner surface, spaced projections of equal length extending inwardly from the annular member for contact with the periphery of a tire, and means to draw the portions together.

3. A tire heater consisting of a hollow annular member comprising two independent semi-circular and separable tubular portions lying in a common plane and sealed at their ends, each portion having a series of radially directed outlets along the inner surface, a header to which one end of each of the two portions is connected for receiving a supply of gaseous combustible mixture, and means to draw the portions together.

4. A tire heater consisting of a hollow annular member comprising two independent semi-circular and separable tubular portions lying in a common plane and sealed at their ends, each portion having a series of radially directed outlets along the inner surface, a separable header to which one end of each of the two portions is connected for receiving a supply of gaseous combustible mixture, and means to draw the portions together.

5. A tire heater consisting of a hollow annular member comprising two independent semi-circular and separable tubular portions lying in a common plane and sealed at their ends, each portion having a plurality of radially directed outlets along the inner surface, a header for supplying gaseous combustible mixture and having branches communicating respectively with the two semi-circular sections, lugs at the respective ends of the said semi-circular sections, stay rods passing therethru, and nuts working thereon for adjustably securing the sections about the tire.

6. A tire heater consisting of a hollow annular member comprising two independent semi-circular and separable tubular portions lying in a common plane and sealed at their ends, each portion having a plurality of radially directed outlets along the inner surface, spaced projections of equal length extending inwardly from the annular member for contact with the periphery of a tire, a header for supplying gaseous combustible mixture and having branches communicating with the two semi-circular sections, lugs at the respective ends of the said semi-circular sections, stay rods passing therethru, and nuts working thereon for adjustably securing the sections about the tire.

7. A tire heater consisting of a hollow annular member comprising two independent semi-circular and separable tubular portions lying in a common plane and sealed at their ends, each portion having a plurality of radially directed outlets along the inner surface, spaced projections of equal length extending inwardly from the annular member for contact with the periphery of a tire, a header for supplying gaseous combustible mixture and having branches communicating with the two semi-circular sections, a union included in said header, lugs at the respective ends of the said semi-circular sections, stay rods passing therethru, and nuts working thereon for adjustably securing the arms about the tire.

Signed at Brooklyn, in the county of Kings and State of New York, this 31st day of October, A. D. 1924.

WALTER C. ELZE.

Signed at Philadelphia, in the county of Philadelphia, and State of Penna., this 28th day of October, A. D. 1924.

ALFRED F. SCHUMANN.